US012026064B2

United States Patent
Lee et al.

(10) Patent No.: US 12,026,064 B2
(45) Date of Patent: Jul. 2, 2024

(54) ELECTRONIC DEVICE AND METHOD OF BACKING UP SECURE ELEMENT

(71) Applicant: Samsung Electronics Co., Ltd., Gyeonggi-do (KR)

(72) Inventors: Donghoon Lee, Gyeonggi-do (KR); Hakhyun Kim, Gyeonggi-do (KR); Daehaeng Cho, Gyeonggi-do (KR); Eunyoung Kwon, Gyeonggi-do (KR); Jongsu Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 110 days.

(21) Appl. No.: 17/848,905

(22) Filed: Jun. 24, 2022

(65) Prior Publication Data

US 2023/0029025 A1 Jan. 26, 2023

Related U.S. Application Data

(63) Continuation of application No. PCT/KR2022/007012, filed on May 17, 2022.

(30) Foreign Application Priority Data

Jul. 22, 2021 (KR) .................. 10-2021-0096576

(51) Int. Cl.
*G06F 11/00* (2006.01)
*G06F 11/14* (2006.01)
(Continued)

(52) U.S. Cl.
CPC ...... *G06F 11/1464* (2013.01); *G06F 11/1469* (2013.01); *H04L 9/0825* (2013.01); *H04L 9/3242* (2013.01); *H04L 9/3249* (2013.01)

(58) Field of Classification Search
None
See application file for complete search history.

(56) References Cited

U.S. PATENT DOCUMENTS 9,607,298 B2   3/2017  Brudnicki et al.
10,037,248 B2  7/2018  Jeon et al.
(Continued)

FOREIGN PATENT DOCUMENTS

KR   10-2015-0016802 A   2/2015
KR   10-2016-0101635 A   8/2016
(Continued)

OTHER PUBLICATIONS

Google Scholar/Patents search—text refined (Year: 2023).*
Google Scholar/Patents search—text refined (Year: 2024).*
International Search Report dated Aug. 17, 2022.

*Primary Examiner* — Christopher S McCarthy
(74) *Attorney, Agent, or Firm* — Cha & Reiter, LLC (57) ABSTRACT

According to certain embodiments, an electronic device comprises: a secure element storing at least one content application and backup data associated with the at least one content application; a memory storing instructions; and a processor electrically connected to the secure element and the memory and configured to executed the instructions, wherein execution of the instructions by the processor causes the processor to perform a plurality of operations comprising: when receiving a message requesting a backup operation from an external electronic device, loading encrypted backup data from the secure element, transmitting the backup data to the external electronic device, and when receiving a message about backup completion from the external electronic device, setting the backup data to an unavailable state.

18 Claims, 6 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 10,509,703 B1* | 12/2019 | Ravid | G06F 11/1469 |
| 10,546,293 B2 | 1/2020 | Khaan et al. | |
| 10,552,827 B2 | 2/2020 | Sheridan et al. | |
| 2004/0187012 A1* | 9/2004 | Kohiyama | G06F 21/6245 |
| | | | 713/193 |
| 2010/0095077 A1* | 4/2010 | Lockwood | G06F 11/1458 |
| | | | 711/E12.103 |
| 2014/0289119 A1 | 9/2014 | Brudnicki et al. | |
| 2015/0301897 A1* | 10/2015 | Jeon | H04W 12/35 |
| | | | 707/640 |
| 2015/0348022 A1 | 12/2015 | Khan et al. | |
| 2016/0063466 A1 | 3/2016 | Sheridan et al. | |
| 2019/0163931 A1 | 5/2019 | Wolverton | |
| 2021/0026535 A1* | 1/2021 | Moon | G06F 3/065 |

FOREIGN PATENT DOCUMENTS

| | | |
|---|---|---|
| KR | 10-2019-0032928 A | 3/2019 |
| KR | 10-2019-0033930 A | 4/2019 |
| KR | 10-2019-0045753 A | 5/2019 |

* cited by examiner

ELECTRONIC DEVICE AND METHOD OF BACKING UP SECURE ELEMENT

CROSS-REFERENCE TO RELATED APPLICATIONS

This application is a continuation of a national stage of International Application No. PCT/KR2022/007012 designating the United States, filed on May 17, 2022, in the Korean Intellectual Property Receiving Office and claiming priority to Korean Patent Application No. 10-2021-0096576, filed on Jul. 22, 2021, in the Korean Intellectual Property Office, the disclosures of which are incorporated by reference herein in their entireties.

BACKGROUND

1. Field

The disclosure relates to an electronic device and method of performing backup of a secure element.

2. Description of Related Art

A secure element (SE) is a chip used to protect confidential data of a user from unauthorized access. An SE can also manage the confidential data in an electronic device, such as a smartphone or a smart wearable.

An SE without a backup function would need reinstallation when used in a new electronic device. Reinstallation may be through communication with a server for each content application. The content application can include, for example, a payment application, a wallet application, a biometric information application, a signature application, an authentication application, and the like.

Also, without a backup function, all the data may need to be removed, and the content application may need to be reinstalled, to restore the data when there is an issue in data of the content application stored in advance.

SUMMARY

According to certain embodiments, an electronic device comprises: a secure element storing at least one content application and backup data associated with the at least one content application; a memory storing instructions; and a processor electrically connected to the secure element and the memory and configured to executed the instructions, wherein execution of the instructions by the processor causes the processor to perform a plurality of operations comprising: when receiving a message requesting a backup operation from an external electronic device, loading encrypted backup data from the secure element, transmitting the backup data to the external electronic device, and when receiving a message about backup completion from the external electronic device, setting the backup data to an unavailable state.

According to certain embodiments, an external electronic device comprises: a secure element storing at least one content application and backup data associated with the at least one content application; a memory storing instructions; and a processor electrically connected to the secure element and the memory and configured execute the instructions, wherein execution of the instructions by the processor causes the processor to perform a plurality of operations comprising: receiving encrypted backup data from an electronic device, decrypting the backup data, installing a content application using the decrypted backup data, and transmitting a message about backup completion to the electronic device.

According to certain embodiments, an electronic device comprises: a secure element comprising backup data and a backup application configured to manage the backup data; a memory storing instructions; and a processor electrically connected to the secure element and the memory and configured to execute the instructions, wherein executing the instructions by the processor causes the processor to perform a plurality of operations, the plurality of operations comprising: when receiving a backup instruction from a user, loading encrypted backup data from the secure element, decrypting the backup data, and reinstalling a content application using the decrypted backup data.

In addition, according to certain embodiments, initialization or restoration of a content application may be performed using backup data when initializing data of the content application or when there is a loss in the data of the content application.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Certain embodiments of the disclosure may provide an electronic device and method of readily performing reinstallation by using backup data, when a new secure element in an external electronic device is used. The reinstallation may be performed separately managing the backup data through a backup application.

In addition, certain embodiments may provide an electronic device and method of performing initialization or restoration of a content application by using backup data when initializing data of the content application or when there is a loss in the data of the content application.

Hereinafter, certain embodiments will be described in greater detail with reference to the accompanying drawings. When describing the example embodiments with reference to the accompanying drawings, like reference numerals refer to like elements and a repeated description related thereto will be omitted.

Electronic Device

Figure 1:
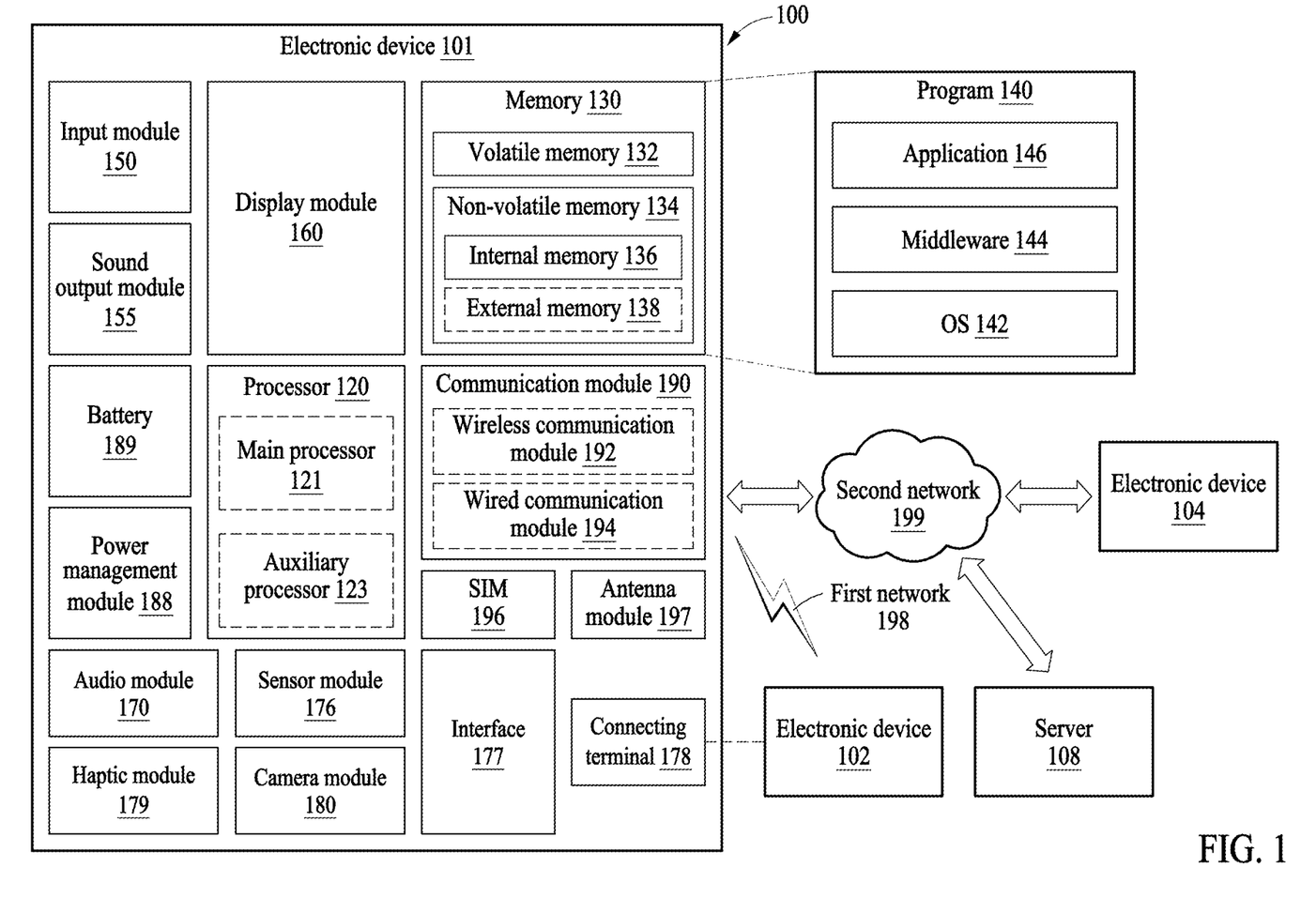
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The term "processor" shall be understood to refer to both the singular and plural contexts in this document.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to certain embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

It is noted that the electronic device 101 can store a variety of information. Among this information can be sensitive information about the user, such as, but not limited to, medical records, financial information, passwords, and identification numbers. If the sensitive information is accessed or otherwise provided to an unauthorized user, the unauthorized user can defraud the user as well as other malicious activity.

Accordingly, the electronic device 101 can include a secure element. A secure element can store content applications, backup applications, and backup data.

Figure 2:
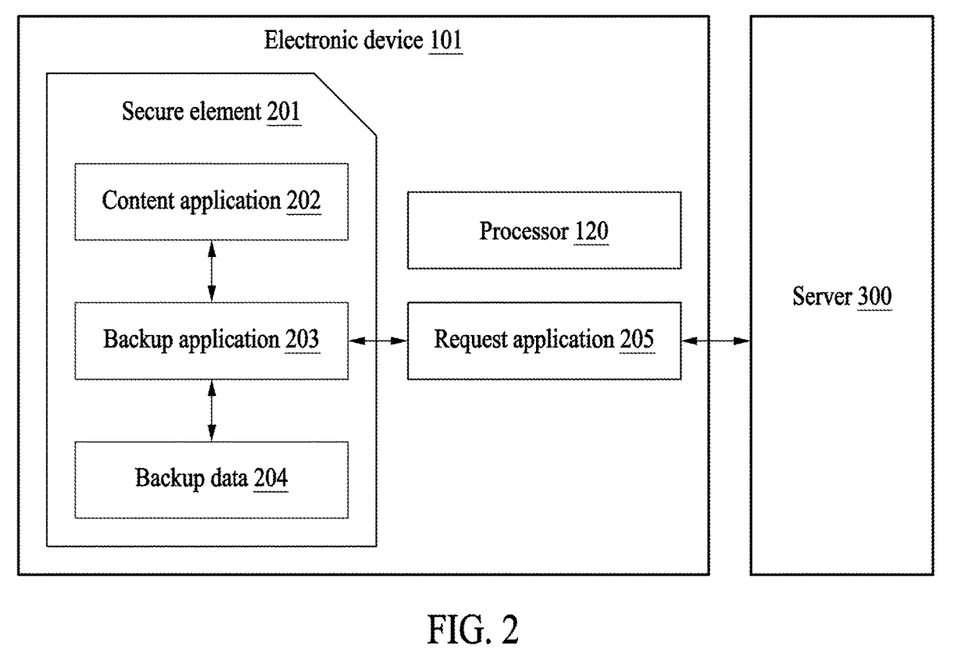
FIG. 2 is a block diagram illustrating a secure element in an electronic device according to certain embodiments.

FIG. 2 is a block diagram illustrating a secure element in an electronic device according to certain embodiments.

Referring to FIG. 2, the electronic device 101 may execute a request application 205. The request application 205 may be stored in a memory and executed by the processor 120. The request application 205 may be an application used to provide a user with an interface for backing up a secure element 201.

The processor 120 may receive a backup instruction from the user through the request application 205. When the backup instruction is received, the processor 120 may perform backup. The processor 120 may perform backup by using backup data 204 from the secure element 201.

Referring to FIG. 2, the electronic device 101 may further include the secure element 201. The secure element 201 may be a chip. The secure element 201 can store confidential data of the user, for example, card information, biometric information, signature information, authentication information (passwords), medical records, and the like. The secure element 201 protects the confidential data from unauthorized access. The secure element 201 may be an embedded secure element (eSE) including a secure OS.

Referring to FIG. 2, the secure element 201 may store a content application 202, a backup application 203, and the backup data 204. The content application 202 may include, but is not limited to, a payment application, a wallet application, a biometric information application, a signature application, an authentication application, among other applications. The content application 202 may be loaded in a memory of the electronic device 101 and executed by the processor 120. The content application 202 may include an applet. An applet can be a component of software executed in another program.

The backup data 204 may be data associated with the content application 202 and data to be backed up. The backup data 204 may include at least one of list information about a content application included in the secure element 201, information about the state of the content application, information about the state of the wireless communication of the content application, information about the authority of the content application, and access information of the content application.

The backup data 204 may further include a package including an installation file and an execution file for each content application. The backup data 204 may further include a hash value for at least one of list information about the content application included in the secure element 201, information about the state of the content application, information about the state of the wireless communication of the content application, information about the authority of the content application, and access information of the content application.

The hash value may be used to verify integrity of the backup data 204. An external electronic device (e.g., the electronic device 102 of FIG. 1) or the processor 120 of the electronic device 101 may determine a hash value of the backup data 204 loaded in the memory and verify the integrity of the backup data 204 by comparing the hash value included in the backup data 204 with the determined hash value. After comparing the two hash values, when the two hash values are the same, the integrity of the backup data 204 may be determined to be maintained. After comparing the two hash values, when the two hash values are different from each other, the integrity of the backup data 204 can be deemed compromised.

The backup data 204 may be encrypted using either a key determined by a server for each content application or a key separately stored in the secure element 201. An initial installation process of the backup data 204 may be described below with reference to FIG. 4.

The backup application 203 may be an application used to manage the backup data 204 on the content application 202. The backup application 203 may be loaded in the memory of the electronic device 101 and executed by the processor 120.

For example, when the backup instruction is received from the user, the processor 120 may identify the backup data 204 loaded through the backup application 203. The request application 205 may transmit a message requesting the backup data 204 via the backup application 203 and receive the backup data 204 from the backup application 203.

Figure 3:
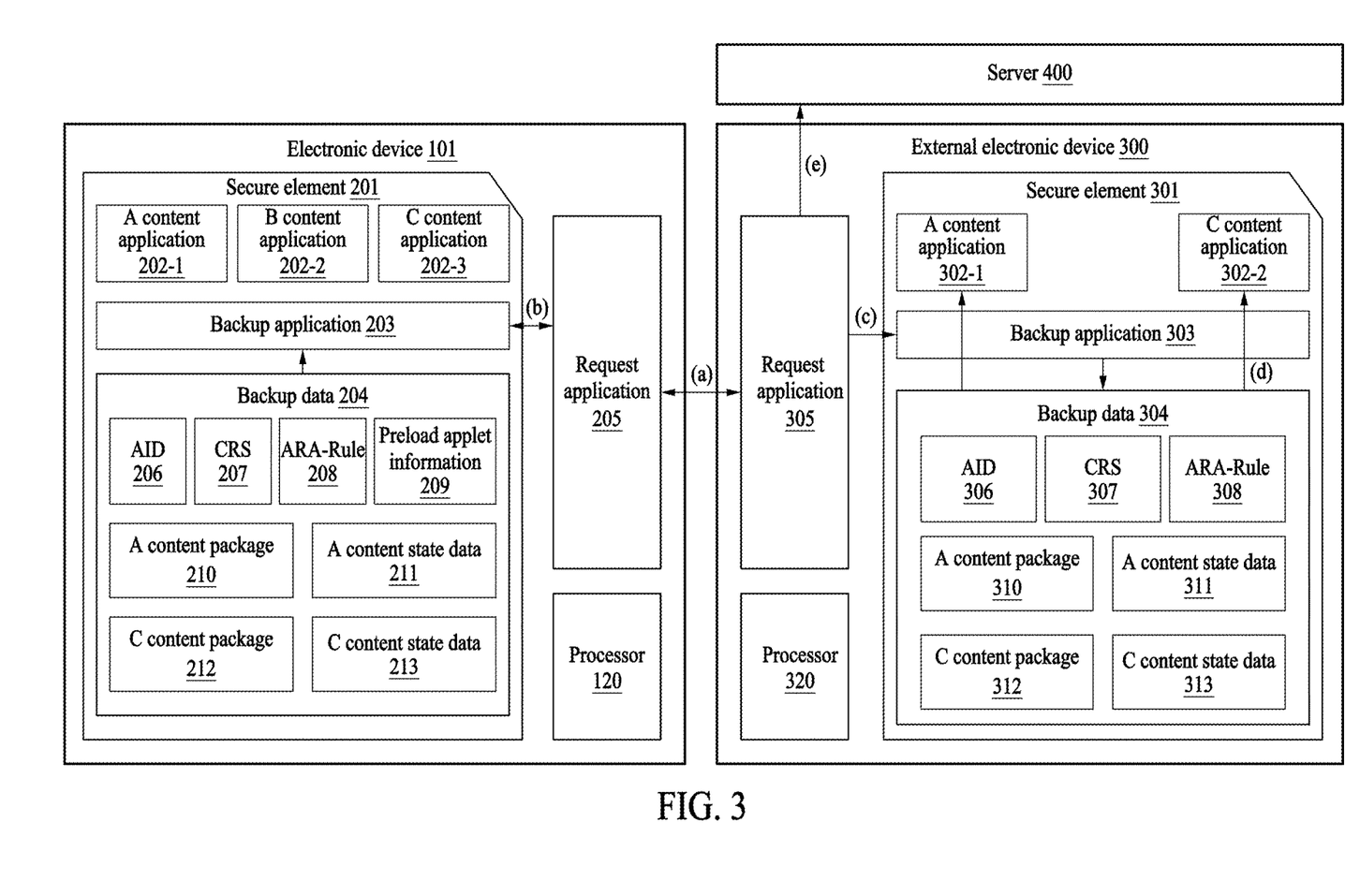
FIG. 3 is a block diagram illustrating a secure element in an electronic device and a secure element in an external electronic device according to certain embodiments.

FIG. 3 is a block diagram illustrating the secure element 201 in an electronic device 101 and a secure element in an external electronic device 300 according to certain embodiments.

A process of performing backup of the secure element 301 included in the external electronic device 300 (e.g., the electronic device 102 of FIG. 1) is illustrated with reference to (a) through (e) of FIG. 3. Referring to FIG. 3, the secure element 201 in the electronic device 101 may store an A content application 202-1, a B content application 202-2, a C content application 202-3, the backup application 203, and the backup data 204. Referring to FIG. 3, a content application may be installed in advance in the secure element 201, and the backup data 204 on the content application may be stored in advance.

Referring to FIG. 3, the backup data 204 for the A content application 202-1 and the C content application 202-3 may be stored in the secure element 201. The A content application 202-1, the B content application 202-2, and the C content application 202-3 may be applications different from one another.

In (a) of FIG. 3, the processor 120 of the electronic device 101 may receive a backup instruction from a user through the request application 205. When receiving the backup instruction, the processor 120 of the electronic device 101 may transmit a message about the backup data 204 to the external electronic device 300 through the request application 205. The message about the backup data 204 may request a backup operation of the backup data 204.

A processor 320 of the external electronic device 300 may receive the message about the backup data 204, and based on the received message, determine whether the request application 205 requesting the backup operation is a reliable request application. The received message, for example, may include an identification (ID) of the electronic device 101, an ID of the request application 205, and the like. The processor 320 of the external electronic device 300 may perform authentication (e.g., PIN authentication) of the request application 205 requesting the backup operation.

When the request application 205 requesting the backup operation is determined to be a reliable request application, the processor 320 of the external electronic device 300 may transmit the message about the backup data 204 to the electronic device 101. The message about the backup data 204 may include a message of approving the backup operation.

According to another example embodiment, in (a) of FIG. 3, the processor 320 of the external electronic device 300 may receive the backup instruction from the user through a request application 305. When receiving the backup instruction, the processor 320 of the external electronic device 300 may transmit the message about the backup data 204 to the electronic device 101 through the request application 305. The message about the backup data 204 may request a backup operation.

The processor 120 of the electronic device 101 may receive the message about the backup data 204, and based on the received message, determine whether the request application 305 requesting the backup operation is a reliable request application. The received message, for example, may include an ID of the electronic device 101, an ID of the request application 305, and the like.

When the request application 305 requesting the backup operation is determined to be a reliable request application, the processor 120 of the electronic device 101 may transmit the message about the backup data 204 to the external electronic device 300. The message about the backup data 204 may include a message of approving the backup operation.

In (b) of FIG. 3, the processor 120 of the electronic device 101 may load the backup data 204 for the A and C content applications 202-1 and 202-3 from the secure element 201 through the request application 205 and the backup application 203. The request application 205 may request the backup data 204 via the backup application 203, and the backup application 203 may verify the received request and transmit the backup data 204 to the request application 205.

The backup data 204 may be data associated with each content application and data to be backed up. The backup data 204 may include at least one of list information about a content application stored in the secure element 201, information about the state of the content application, information about the state of the wireless communication of the content application, information about the authority of the content application, and access information of the content application.

The backup data 204 may further include a package including an installation file and an execution file for each content application. Referring to FIG. 3, the backup data 204 may include an A content package 210, which is a package of the A content application 202-1, A content state data 211, a C content package 212, which is a package of the C content application 202-3, and C content state data 213.

The backup data 204 may include an application ID (AID) 206, a contactless registry service (CRS) 207, an access rule application master-rule (ARA-Rule) 208, preload applet information 209, lifecycle information, and associated security domain (SD) information.

The AID 206 may refer to an ID of each content application. The list information about content applications may be data storing the AID 206 of each of the content applications as a list.

The CRS 207 may provide a control flag for wireless communication of each content application. The ARA-Rule 208 may be data defining access authority between applications in the secure element 201 and applications outside the secure element 201. The preload applet information 209 may include applets installed initially when the secure element 201 is generated.

The lifecycle information may refer to state information on a content application or an applet. The associated SD information may refer to information on an SD including a content application or an applet.

The processor 120 of the electronic device 101 may generate the secure element 201 and a secure channel protocol by using a key stored in the secure element 201 and extract the backup data 204 from the secure element 201 by using the secure channel protocol. The key stored in advance in the secure element 201 may be generated in advance for backup authentication.

The electronic device 101 may transmit the backup data 204 to the external electronic device 300. The transmitting of the backup data 204 from the electronic device 101 to the external electronic device 300 may be performed by transmitting the backup data 204 from the request application 205 of the electronic device 101 to the request application 305 of the external electronic device 300.

In (c) of FIG. 3, the backup data 204 may be transmitted to a backup application 303. The processor 320 of the external electronic device 300, through the backup application 303, may determine whether the request application 305 of the external electronic device 300 is an approved application and receive the backup data 204.

The processor 320 of the external electronic device 300 may verify integrity of the backup data 204. The processor 320 of the external electronic device 300 may determine a hash value corresponding to the received backup data 204 and verify the integrity of the backup data 204 by comparing a hash value included in the backup data 204 to the determined hash value. After comparing the two hash values, when the two hash values are the same, the integrity of the backup data 204 may be determined to be maintained. After comparing the two hash values, when the two hash values are different from each other, the integrity of the backup data 204 may be deemed compromised.

According to another example embodiment, an elliptic curve digital signature algorithm (ECDSA) may be used to verify the integrity of the backup data 204. The processor 320 of the external electronic device 300 may verify the integrity of the backup data 204 by verifying an elliptic curve digital signature of the backup data 204.

When the integrity of the backup data 204 is not verified, the processor 320 of the external electronic device 300 may transmit a backup failure message to the electronic device 101 without storing the backup data 204.

The processor 320 of the external electronic device 300 may perform decryption on the backup data 204. The processor 320 of the external electronic device 300 may perform the decryption on the backup data 204 by using a key received from a server (e.g., a server 400) of a content application or the key stored in advance in the secure element 201 in the electronic device 101.

Backup data 304 may be installed only when receiving a consent message from the server (e.g., the server 400) of each content application. The processor 320 of the external electronic device 300 may transmit a message about a backup state to the server (e.g., the server 400) of the content application.

In (d) of FIG. 3, the processor 320 of the external electronic device 300 may store the backup data 304 and install content applications (e.g., an A content application 302-1 and a C content application 302-2) by using the backup data 304.

Referring to FIG. 3, the backup data 304 may include an A content package 310, which is a package of the A content application 302-1, A content state data 311, a C content package 312, which is a package of the C content application 302-2, and C content state data 313.

The backup data 304 may include an application ID (AID) 306, a contactless registry service (CRS) 307, an access rule application master-rule (ARA-Rule) 308, A content package 310, lifecycle information, and associated security domain (SD) information.

The processor 320 of the external electronic device 300 may install the content applications with reference to list information (e.g., a list of the AID 306) included in the backup data 304. The processor 320 of the external electronic device 300 may install an SD for a file system in the secure element 301.

The processor 320 of the external electronic device 300 may install the content applications (e.g., an A content application 302-1 and a C content application 302-2) by using each content package (e.g., an A content package 310 and a C content package 312). The processor 320 of the external electronic device 300 may install an applet by using an executable load file (ELF) included in a content package. The processor 320 of the external electronic device 300 may install an ARA-Rule 308 on a content application (e.g., an A content application 302-1 and a C content application 302-2) included in the backup data 304. The ARA-Rule 308 may define authority controlling access of the content application.

The processor 320 of the external electronic device 300 may set information about the state of wireless communication of the content application included in the backup data 304, information about the authority of the content application, and by using access information of the content application, state information on a newly installed content application.

The processor 320 of the external electronic device 300 may perform contactless activation of the content application, based on the set state information on the content application. The setting of the state information on the content application may be implemented, for example, by using a command provided on a global platform.

The processor 320 of the external electronic device 300 may transmit a message about backup completion to the electronic device 101. The message about backup completion may include a message of requesting a state change of the backup data 204 stored in the electronic device 101.

The processor 120 of the electronic device 101, when receiving the message about backup completion from the external electronic device 300, may set the backup data 204 to an unavailable state (or a state that the data cannot be used without further authentication, now collectively referred to unavailable state). The backup data 204 may be set to, for example, a suspended state, according to a command associated with state setting.

In (e) of FIG. 3, the processor 320 of the external electronic device 300 may transmit the message about backup completion to a trusted service manager (e.g., a service provider) of each server (e.g., the server 400) of backed-up content applications. The message about backup completion may include state information about the backed-up content applications and information on the external electronic device 300.

The processor 320 of the external electronic device 300 may receive a message about activation from a server (e.g., the server 400) of a content application. The content application in the secure element 301 may readily operate when receiving the message about activation from the server (e.g., the server 400) of the content application.

Figure 4:
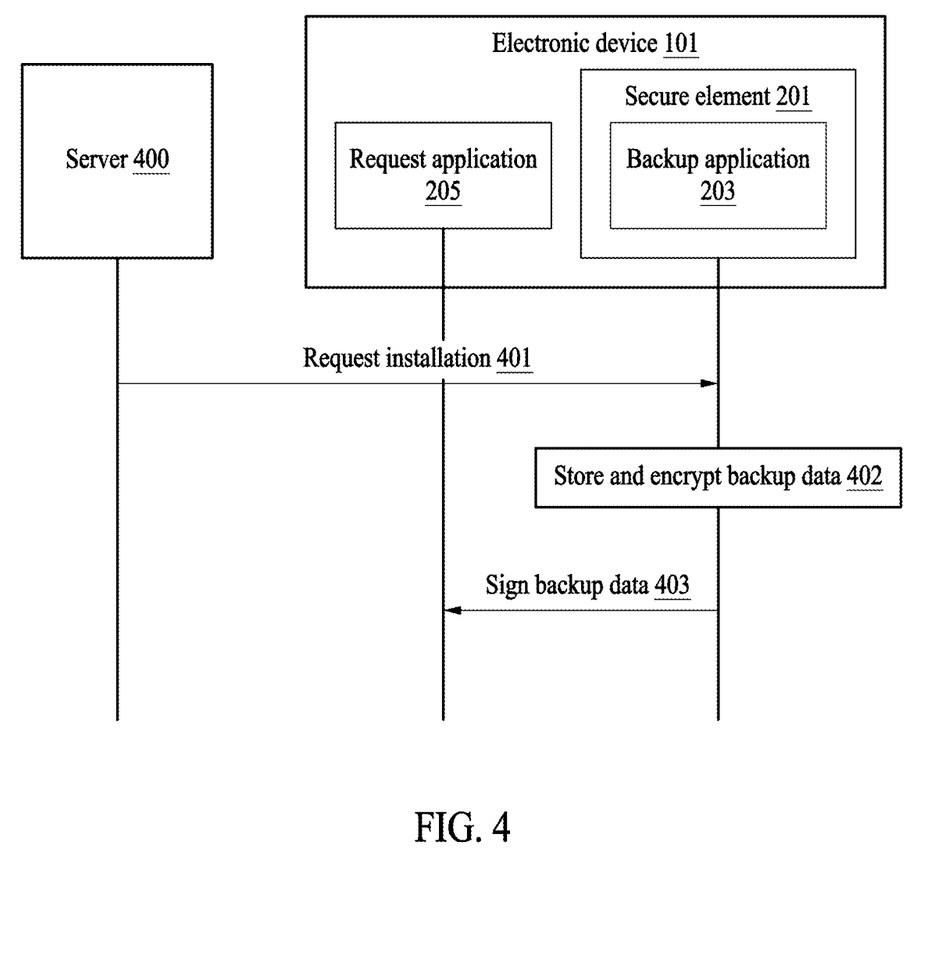
FIG. 4 is a flowchart illustrating a process of storing backup data according to certain embodiments.

FIG. 4 is a flowchart illustrating a process of storing backup data (e.g., the backup data 204) according to certain embodiments.

The request application 205 and the backup application 203 illustrated in FIG. 4 may both be executed by the processor 120 of the electronic device 101. Operations of the request application 205 and the backup application 203 illustrated in FIG. 4 may both be executed by the processor 120 of the electronic device 101.

A portion of content applications may be installed on the secure element 201 in the electronic device 101 in advance, based on a preload applet that was installed at manufacture. Encryption of the backup data 204 on content applications may be performed using a key stored in advance in the secure element 201. The backup data 204 of the portion of content applications may be stored in advance in the secure element 201. The backup data 204 may be encrypted using the key.

In operation 401, the server requests installation. The processor 120 of the electronic device 101 may install an SD through communication with the server 400 of a content application. The processor 120 may install the content application by executing an ELF in the SD. Operation 401 may be implemented as the request application 205 receives data of the server 400, and the backup application 203 transmits the received data.

In operation 402, the electronic device 101 stores and encrypts backup data. The processor 120 may store the backup data 204 on the installed content application. The processor 120 may encrypt the backup data 204 by using a key (e.g., a public key) received from the server 400 of the content application or the key stored in advance in the secure element 201. Storing and encrypting, for example, the backup data 204 may be performed by the backup application 203. An advanced encryption standard-256 (AES-256) may be used to encrypt the backup data 204.

The backup data 204 may include a package including an installation file and an execution file of each content application. The backup data 204 may include at least one of list information on a content application included in the secure element 201, state information about the content application, state information about wireless communication of the content application, information on authority of the content application, and access information of the content application.

In operation 403, the secure element 201 transmits signing backup data. The processor 120 may store a signature value for the backup data 204 to verify integrity of the backup data 204. An ECDSA may be used to determine the signature value for the backup data 204. Signing, for example, the backup data 204 may be performed by the backup application 203.

Figure 5:
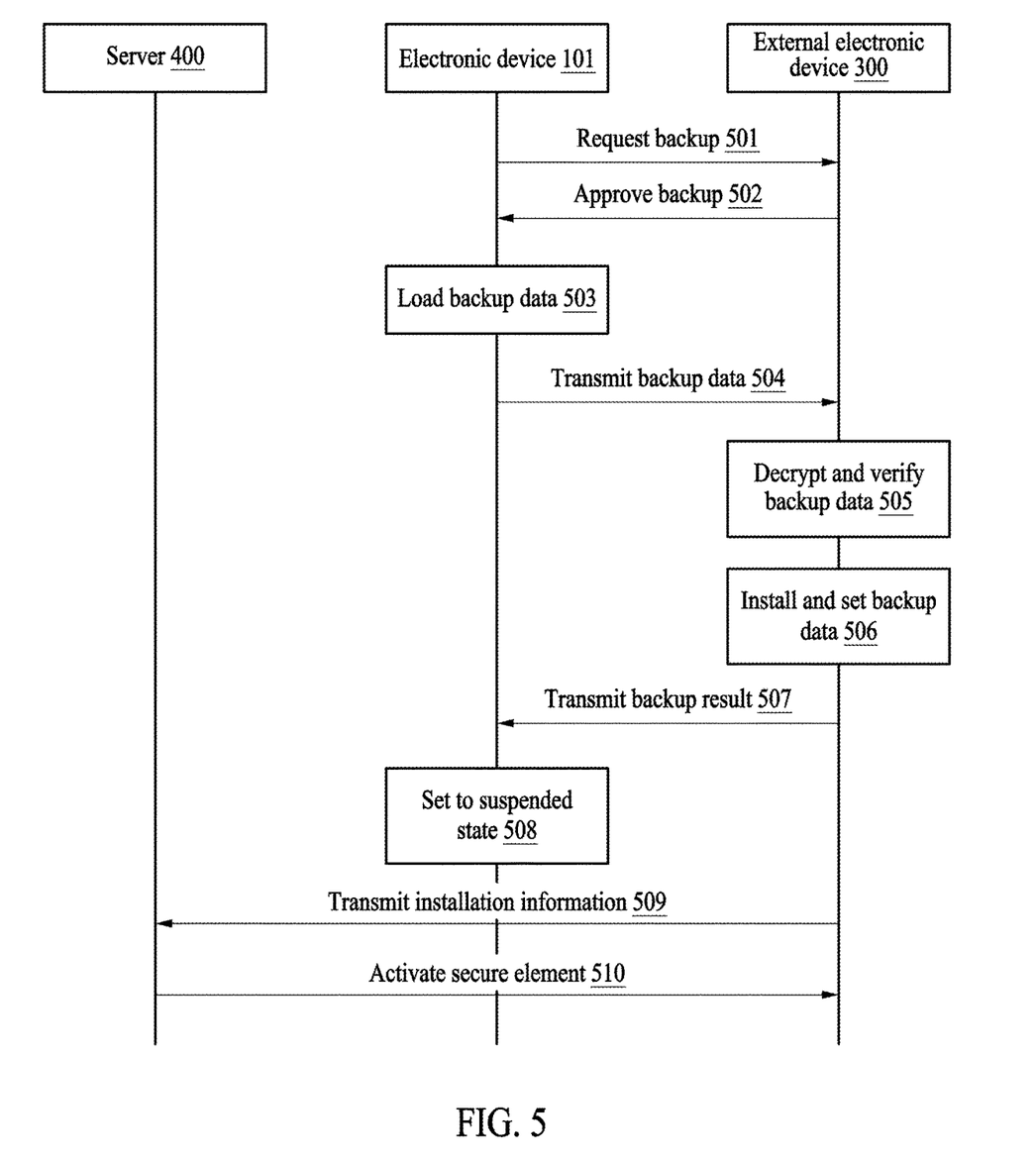
FIG. 5 is a flowchart illustrating a backup process of an external electronic device according to certain embodiments.

FIG. 5 is a flowchart illustrating a backup process of an external electronic device (e.g., the external electronic device 300) according to certain embodiments.

In operation 501, the electronic device 101 transmits a message requesting a backup operation. The processor 120 of the electronic device 101 may receive a backup instruction from a user through the request application 205 and transmit a message about the backup data 204 to the external electronic device 300 through the request application 205. The message about the backup data 204 may include a message of requesting a backup operation.

In operation 502, the external electronic device 300 can approve backup. The processor 120 of the external electronic device 300 may receive the message about the backup data 204, and based on the received message, determine whether the request application 205 requesting the backup operation is a reliable request application. The received message, for example, may include an ID of the electronic device 101, an ID of the request application 205, and the like.

In operation 503, the electronic device 101 can load backup data. The processor 120 of the electronic device 101 may load the backup data 204 for content applications from the secure element 201 through the request application 205 and the backup application 203. Loading the backup data 204 may be implemented as the request application 205 requests the backup data 204 via the backup application 203, and the backup application 203 verifies the received request and transmits the backup data 204 to the request application 205.

The processor 120 of the electronic device 101 may generate the secure element 201 and a secure channel protocol by using a key stored in the secure element 201 and extract the backup data 204 from the secure element 201 by using the secure channel protocol.

In operation 504, the electronic device 101 can transmit backup data. The processor 120 of the electronic device 101 may transmit the backup data 204 to the external electronic device 300. The transmitting of the backup data 204 from the electronic device 101 to the external electronic device 300 may be performed by transmitting the backup data 204 from the request application 205 of the electronic device to the request application 305 of the external electronic device 300. The processor 320 of the external electronic device 300, through the backup application 303, may determine whether the request application 305 of the external electronic device 300 is an approved application, and when the request application 305 is determined to be an approved application, receive the backup data 204.

In operation 505, the external electronic device 300 can decrypt and verify backup data. The processor 320 of the external electronic device 300 may verify integrity of the backup data 204. An ECDSA may be used to verify the integrity of the backup data 204. The processor 320 of the external electronic device 300 may verify the integrity of the backup data 204 by verifying an elliptic curve digital signature of the backup data 204. The processor 320 of the external electronic device 300 may perform decryption on the backup data 204. The processor 320 of the external electronic device 300 may perform decryption by using a key received from the server 400 of the content application or the key stored in advance in the secure element 201 in the electronic device 101.

To decrypt and verify backup data, the processor 320 of the external electronic device 300 may perform decryption on the backup data 204. The processor 320 of the external electronic device 300 may perform the decryption by using the key received from the server 400 of the content application or the key stored in advance in the secure element 201 in the electronic device 101.

In operation 506, the external electronic device 300 can install and set backup data. The processor 320 of the external electronic device 300 may set state information on a content application included in the backup data 204 to be the same as state information on the backup data 204 included in the electronic device 101. The processor 320 of the external electronic device 300 may perform wireless activation of the content application, based on the set state information on the content application.

The processor 320 of the external electronic device 300 may store the backup data 304 and install content applications by using the backup data 204. The processor 320 of the external electronic device 300 may install the content applications by using each content package.

In operation 507 the external electronic device 300 can transmit a backup result. The processor 320 of the external electronic device 300 may transmit a message about backup completion to the electronic device 101. The message about backup completion may include a message of requesting a state change of the backup data 204 stored in the electronic device 101.

In operation 508, the electronic device sets the backup data 204 to a suspended state. The processor 120 of the electronic device 101, when receiving the message on backup completion from the external electronic device 300, may set the backup data 204 to an unavailable state.

In operation 509, the external electronic device 300 transmits installation information. The processor 320 of the external electronic device 300 may transmit the message about backup completion to each server (e.g., the server 400) of backed-up content applications. The message about backup completion may include state information on the backed-up content applications and information on the external electronic device 300.

In operation 510, the server 400 can activate a secure element 301. The processor 320 of the external electronic device 300 may receive a message on activation from the server 400 of the content application. The content application in the secure element 301 may readily operate when receiving the message on activation from the server 400 of the content application.

Figure 6:
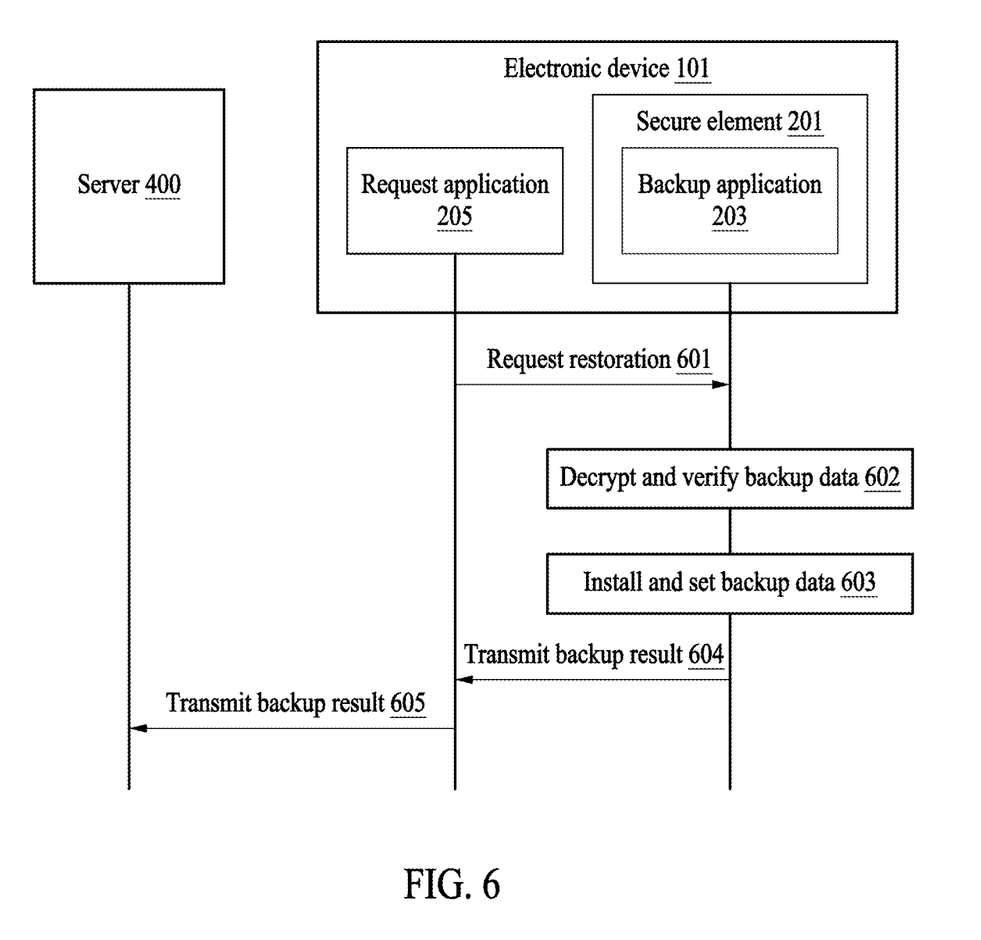
FIG. 6 is a flowchart illustrating a restoration process using backup data according to certain embodiments.

FIG. 6 is a flowchart illustrating a restoration process using backup data (e.g., the backup data 204) according to certain embodiments.

In operation 601, the request application 205 requests restoration. The processor 120 of the electronic device 101 may receive a restoration instruction from a user through the request application 205. Requesting restoration may be implemented as the request application 205 receives the restoration instruction from the user and transmits a restoration request using the backup data 204 to the backup application 203.

In operation 602, the secure element 201 decrypts and verifies the backup data 204. The processor 120 may verify integrity of the backup data 204 stored in the secure element 201 in the electronic device 101 and perform decryption on the backup data 204. An ECDSA may be used to verify the integrity of the backup data 204. The processor 120 of the electronic device 101 may verify the integrity of the backup data 204 by verifying an elliptic curve digital signature of the backup data 204.

When restoring a portion of content applications installed in advance based on a preload applet, the processor 120 of the electronic device 101 may perform the decryption by using a key received from the server 400 of a content application or a key stored in advance in the secure element 201 in the electronic device 101. For example, the backup data 204 on the portion of content applications installed in advance based on the preload applet may be encrypted and decrypted using a symmetric key (e.g., Rivest Shamir Adleman (RSA) 2048).

In operation 603, the secure element 201 may install and set the backup data 204. The processor 120 may set state information on a content application included in the backup data 204 to be the same as state information on the backup data 204 included in the electronic device 101. The processor 120 of the electronic device 101 may perform wireless activation of the content application, based on the set state information on the content application.

In operation 604, the secure element 201 transmits a backup result. The processor 120 may determine information about the backup result. Transmitting the backup result may be implemented as the information on the backup result determined by the backup application 203 is transmitted to the request application 205. The information on the backup result may include, for example, state information on the content applications after backup.

In operation 605, the request application 205 may transmit the backup result. The processor 120 may transmit a message about backup completion to each server (e.g., the server 400) of the backed-up content applications. The message about backup completion may include state information on the backed-up content applications and information (e.g., a device ID) on the external electronic device 300. The processor 120 of the electronic device 101 may receive a message on activation from the server 400 of a content application. The content application in a secure element may readily operate when receiving the message on activation from the server 400 of the content application.

An electronic device may include, a secure element 201 storing at least one content application and backup data 204 associated with the content application, a memory storing instructions, and a processor 120 electrically connected to the secure element 201 and the memory, wherein execution of the instructions by the processor causes the processor to perform a plurality of operations, the plurality of operations comprising, when receiving a message requesting a backup operation from an external electronic device 300, loading encrypted backup data 204 from the secure element 201 and transmitting the backup data 204 to the external electronic device 300, and when receiving a message about backup completion from the external electronic device 300, setting the backup data 204 to an unavailable state.

The processor 120 may generate the secure element 201 and a secure channel protocol by using a key stored in the secure element 201 and extract the backup data 204 from the secure element 201 by using the secure channel protocol.

The backup data 204 transmitted to the external electronic device 300, on which integrity verification and decryption may be performed by the external electronic device 300, may be stored in a secure element in the external electronic device 300.

The backup data 204 may be data encrypted using a key determined by the server 400 of the content application.

The backup data 204 may include at least one of list information about at least one content application stored in the secure element 201, information about the state of wireless communication of the content application, information about authority of the content information, and access information of the content application.

The backup data 204 may further include a hash value for at least one of the list information about the content application stored in the secure element 201, information about the state of wireless communication of the content information, the information about authority of the content application, and the access information of the content application.

According to certain embodiments, an external electronic device 300 may include, a secure element 201 storing at least one content application, backup data 204 associated with the content application, memory storing instructions, and a processor 120 electrically connected to the memory, and the secure element 201, in which the processor 120 is configured to execute the instructions, wherein execution of the instructions causes the processor to perform a plurality of operations, the plurality of operations comprising: receiving encrypted backup data 204 from an electronic device 101, decrypting the backup data 204, installing a content application by using the decrypted backup data 204, and transmitting a message about backup completion to the electronic device 101.

The processor 120 may determine a hash value for the backup data 204 and verify integrity of the backup data 204 by comparing the hash value included in the backup data 204 to the determined hash value.

The backup data 204 may include at least one of list information on a content application, state information on the content application, state information on wireless communication of the content application, information on authority of the content information, and information on access of the content application.

The processor 120 may transmit a message on installation of the content application to the server 400 of the content application and receive a message on activation of the content application from the server 400.

In certain embodiments, decryption comprises decrypting the backup data using a symmetric key.

In certain embodiments, the symmetric key comprises an RSA 2048 key.

In certain embodiments, the secure element comprises an embedded secure element.

According to certain embodiments, an electronic device 101 may include a secure element 201 including backup data 204 and a backup application 203 configured to manage the backup data 204 and a processor 120 electrically connected to the secure element 201, in which the processor 120, when receiving a backup instruction from a user, may load encrypted backup data 204 from the secure element 201, decrypt the backup data 204, and by using the decrypted backup data 204, reinstall a content application.

The backup data 204 may include at least one of list information on a content application, state information on the content application, state information on wireless communication of the content application, information on authority of the content information, and information on access of the content application.

The processor 120 may transmit a message on installation of the content application to the server 400 of the content application.

The processor 120 may determine a hash value for the backup data 204 and verify integrity of the backup data 204 by comparing a hash value included in the backup data 204 to the determined hash value.

In certain embodiments, decryption comprises decrypting the backup data using a symmetric key.

In certain embodiments, the symmetric key comprises an RSA 2048 key.

In certain embodiments, the secure element comprises an embedded secure element.

According to certain embodiments, a method of backing up a secure element 201 may include receiving a message on backup data 204 from an external electronic device 300, loading encrypted backup data 204 from the secure element 201, transmitting the backup data 204 to the external electronic device 300, receiving a message on backup completion from the external electronic device 300, and setting the backup data 204 to an unavailable state.

The method may further include generating the secure element 201 and a secure channel protocol by using a key stored in the secure element 201 and extracting the backup data 204 from the secure element 201 by using the secure channel protocol.

According to certain embodiments, a method of backing up a secure element 201 may include receiving encrypted backup data 204 from an electronic device 101, performing decryption on the backup data 204, installing a content application by using the decrypted backup data 204, and transmitting a message on backup completion to the electronic device 101.

The method may further include transmitting a message on installation of the content application to the server 400 of the content application and receiving a message on activation of the content application from the server 400.

According to certain embodiments, a method of backing up a secure element 201 may include receiving a backup instruction from a user, loading encrypted backup data 204 from the secure element 201, decrypting the backup data 204, and by using the decrypted backup data 204, reinstalling a content application.

The electronic device according to certain embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that certain embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Certain embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a secure element storing at least one content application and backup data associated with the at least one content application;
   a memory storing instructions; and
   a processor electrically connected to the secure element and the memory and configured to execute the instructions, wherein execution of the instructions by the processor causes the processor to perform a plurality of operations comprising:
   when receiving a message requesting a backup operation from an external electronic device, loading encrypted backup data from the secure element, transmitting the backup data to the external electronic device, and when receiving a message about backup completion from the external electronic device, setting the backup data to an unavailable state,
   when the content application is installed on the external electronic device using the backup data, a message about installation of the content application is transmitted from the external electronic device to a server of the content application.

2. The electronic device of claim 1, wherein the plurality of operations further comprises:
   generating the secure element and a secure channel protocol by using a key stored in the secure element and extracting the backup data from the secure element by using the secure channel protocol.

3. The electronic device of claim 1, wherein the backup data is stored in a secure element in the external electronic device.

4. The electronic device of claim 1, wherein the backup data is data encrypted with a key determined by a server of the at least one content application.

5. The electronic device of claim 1, wherein the backup data comprises at least one of list information about the at least one content application stored in the secure element, information about the state of wireless communication of the content application, information about authority of the content application, and access information of the content application.

6. The electronic device of claim 5, wherein the backup data further comprises a hash value for at least one of the list information about the content application stored in the secure element, information about the state of wireless communication of the content application, the information about authority of the content application, and the access information of the content application.

7. An external electronic device comprising:
   a secure element storing at least one content application and backup data associated with the at least one content application;
   a memory storing instructions; and
   a processor electrically connected to the secure element and the memory and configured to execute the instructions, wherein execution of the instructions by the processor causes the processor to perform a plurality of operations comprising:
   receiving encrypted backup data from an electronic device, decrypting the backup data, installing a content application using the decrypted backup data, transmitting a message about backup completion to the electronic device, and transmitting a message about installation of the content application to a server of the content application and receiving a message about activation of the content application from the server.

8. The external electronic device of claim 7, wherein the plurality of
   operations further comprises:
   determining a hash value of the backup data and verifying integrity of the backup data by comparing a hash value in the backup data with the determined hash value.

9. The external electronic device of claim 7, wherein the backup data comprises at least one of list information about the at least one content application, information about the state of wireless communication of the content application, information about authority of the content application, and access information of the content application.

10. The external electronic device of claim 7, wherein decryption comprises decrypting the backup data using a symmetric key.

11. The external electronic device of claim 10, wherein the symmetric key comprises an RSA 2048 key.

12. The external electronic device of claim 7 wherein the secure element comprises an embedded secure element.

13. An electronic device comprising:
    a secure element comprising backup data and a backup application configured to manage the backup data;
    a memory storing instructions; and
    a processor electrically connected to the secure element and the memory and configured to execute the instructions, wherein executing the instructions by the processor causes the processor to perform a plurality of operations, the plurality of operations comprising:
    when receiving a backup instruction from a user, loading encrypted backup data from the secure element, decrypting the backup data, reinstalling a content application using the decrypted backup data, and transmitting a message about installation of the content application to a server of the content application.

14. The electronic device of claim 13, wherein the backup data comprises at least one of list information about the content application, information about a state of wireless communication of the content application, information about authority of the content application, and access information of the content application.

15. The electronic device of claim 13, wherein the plurality of operations further comprises:
  determining a hash value of the backup data and verifying integrity of the backup data by comparing a hash value in the backup data with the determined hash value.

16. The electronic device of claim 13, wherein decryption comprises decrypting the backup data using a symmetric key.

17. The electronic device of claim 16, wherein the symmetric key comprises an RSA 2048 key.

18. The electronic device of claim 13 wherein the secure element comprises an embedded secure element.

* * * * *